United States Patent
Rodgers et al.

(10) Patent No.: US 7,194,175 B1
(45) Date of Patent: Mar. 20, 2007

(54) 3D PHOTONIC BANDGAP DEVICE IN SOI

(75) Inventors: John Scott Rodgers, San Diego, CA (US); Joanna N. Ptasinski, San Diego, CA (US); Stephen D. Russell, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/332,437

(22) Filed: Jan. 13, 2006

(51) Int. Cl.
 *G02B 6/10* (2006.01)
(52) U.S. Cl. ............ 385/131; 385/129; 385/130; 385/146; 385/14; 385/141
(58) Field of Classification Search ........... 385/129, 385/130, 131, 132, 122, 141, 14, 146, 125
See application file for complete search history.

(56) References Cited

U.S. PATENT DOCUMENTS

| | | | |
|---|---|---|---|
| 6,358,854 B1 | 3/2002 | Fleming et al. | 438/692 |
| 6,366,392 B1 * | 4/2002 | Tokushima | 359/321 |
| 6,466,360 B2 * | 10/2002 | Tokushima | 359/321 |
| 6,597,851 B2 | 7/2003 | Johnson et al. | 385/131 |
| 6,671,443 B2 | 12/2003 | Deliwala | 385/125 |
| 6,821,903 B2 | 11/2004 | Cotteverte et al. | 438/706 |
| 6,869,881 B2 | 3/2005 | Deliwala | 385/125 |
| 6,936,854 B2 * | 8/2005 | Iwasaki et al. | 257/81 |

OTHER PUBLICATIONS

L. H. Frandsen, A. Harpoth, P.I. Borel, M. Kristensen, J.S. Jensen, O.Sigmund, "Broadband Photonic Crystal Waveguide 60-degree Bend Obtained Utilizing Topology Optimization," Optics Express 5916, Nov. 29, 2004, vol. 12 No. 24.

* cited by examiner

*Primary Examiner*—Brian M. Healy
(74) *Attorney, Agent, or Firm*—Allan Y. Lee; Michael A. Kagan; Peter A. Lipovsky

(57) ABSTRACT

A 3D Photonic Bandgap Device in SOI (NC#97719). The structure includes a substrate having a semiconductor layer over an insulator layer and a 3D photonic bandgap structure having at least one period operatively coupled to the substrate.

18 Claims, 8 Drawing Sheets (Note: Figs 1A -1D Are Not Drawn To Scale Relative To Each Other)

100

102

(Note: Figs 1A -1D Are Not Drawn To Scale Relative To Each Other)

104

106

3D PHOTONIC BANDGAP DEVICE IN SOI

FEDERALLY SPONSORED RESEARCH AND DEVELOPMENT

This invention (Navy Case No. 97719) was developed with funds from the United States Department of the Navy. Licensing inquiries may be directed to the Office of Patent Counsel, Space and Naval Warfare Systems Center, San Diego, Code 20012, San Diego, Calif., 92152; telephone (619) 553-3001.

CROSS-REFERENCE TO RELATED APPLICATION

This application is related to U.S. Pat. No. 6,597,851 B2, entitled "Periodic Dielectric Structure Having a Complete Three-Dimensional Photonic Band Gap," by Johnson et al. issued Jul. 22, 2003, which is hereby incorporated by reference herein in its entirety for its teachings on photonic bandgap devices and is hereinafter referred to as the "Johnson patent."

BACKGROUND OF THE INVENTION

The 3D photonic bandgap device in SOI is generally in the field of photonic bandgap devices.

Typical photonic bandgap devices are two dimensional and are not fabricated on semiconductor on insulator (SOI).

A need exists for photonic bandgap devices that are three dimensional and are fabricated on SOI.

DETAILED DESCRIPTION OF THE INVENTION

Described herein is 3D Photonic Bandgap Device in SOI.

Definitions

The Following Acronyms are Used Herein

Acronym(s):

3D—three dimensional

PBG—Photonic Bandgap

SOI—Semiconductor on Insulator

The 3D photonic bandgap (PBG) device in SOI (semiconductor on insulator) includes a 3D PBG structure fabricated in SOI. In one embodiment, the present 3D PBG device in SOI includes a 3D PBG structure having one period in a selected axis. In one embodiment, the present 3D PBG device in SOI includes a 3D PBG device having a funnel-shaped waveguide. In one embodiment, the present 3D PBG device in SOI includes a 3D PBG device monolithically fabricated with at least one electronic component in SOI.

Figure 1A:
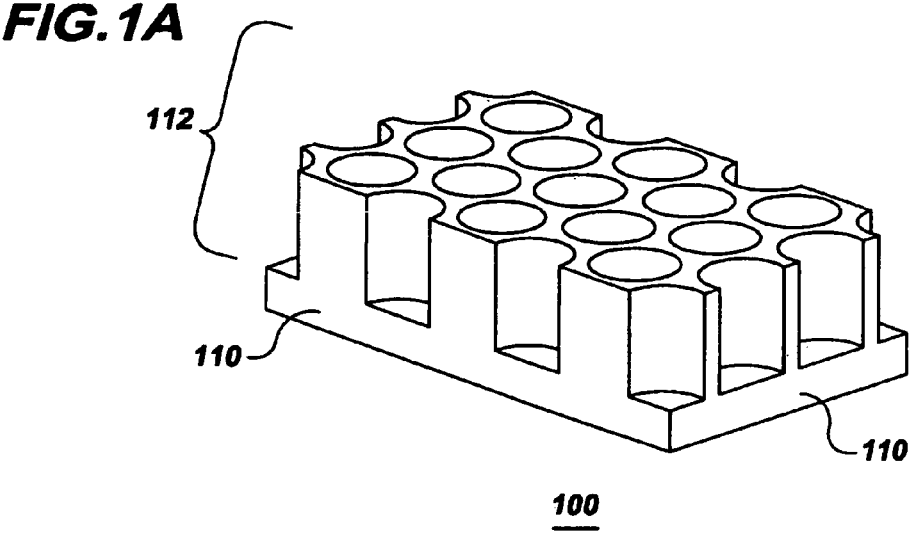
FIG. 1A is a perspective view of one embodiment of a 3D photonic bandgap device.
Figure 1B:
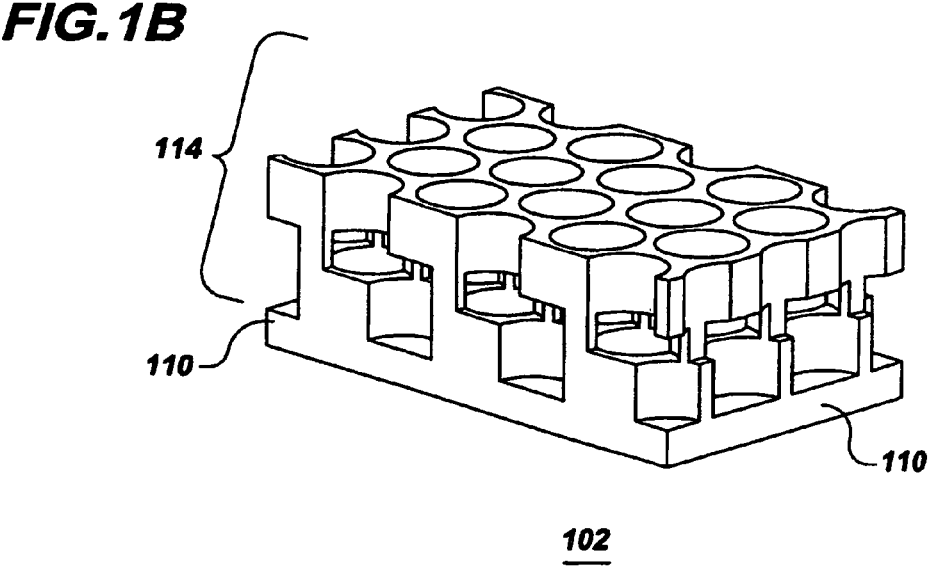
FIG. 1B is a perspective view of one embodiment of a 3D photonic bandgap device.
Figure 1C:
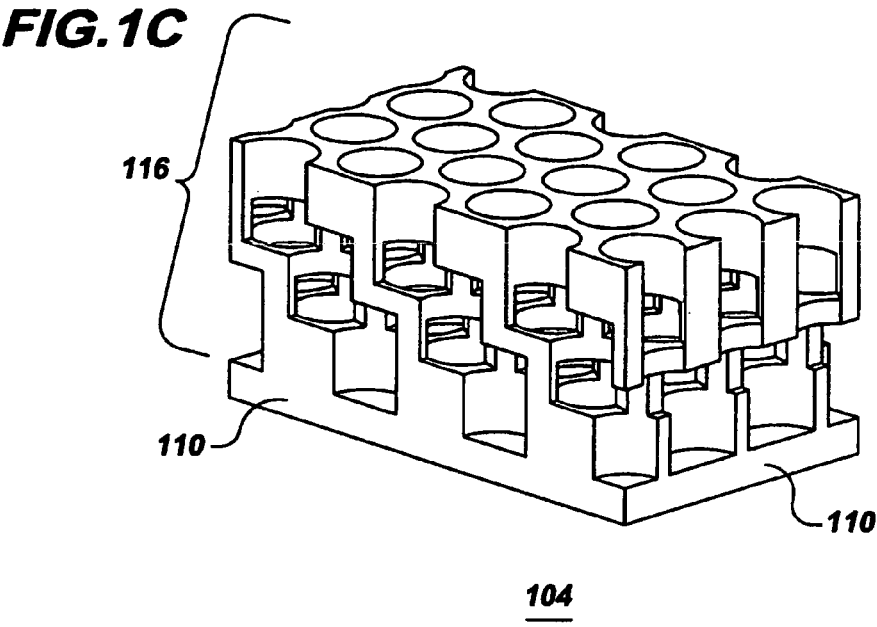
FIG. 1C is a perspective view of one embodiment of a 3D photonic bandgap device.

FIGS. 1A–1C are perspective views of embodiments of a 3D photonic bandgap device in intermediate stages of fabrication. FIG. 1A is a perspective view of one embodiment of a 3D photonic bandgap device in an intermediate stage of fabrication. As shown in FIG. 1A, 3D PBG device 100 includes substrate 110 and PBG structure 112. Substrate 110 comprises a semiconductor layer over an insulator layer. Exemplary semiconductor layers include silicon and germanium. Exemplary insulator layers include quartz, silicon dioxide and sapphire. In one embodiment, substrate 110 includes a silicon layer over an insulator layer. In one embodiment, substrate 110 includes a silicon layer over a quartz layer. In one embodiment, substrate 10 includes a silicon layer over a sapphire layer. PBG structure 112 comprises a honeycomb-like structure having high index regions and low index regions. The honeycomb-like structure includes cylinders having a diameter and height. In one embodiment, the low index regions of PBG structure 112 comprise air. In one embodiment, the low index regions of PBG structure 112 comprise silicon dioxide. In one embodiment, the high index regions of PBG structure 112 comprise silicon.

FIG. 1B is a perspective view of one embodiment of a 3D photonic bandgap device in an intermediate stage of fabrication. As shown in FIG. 1B, 3D PBG device 102 includes substrate 110 and PBG structure 114. Substrate 110 of FIG. 1B is substantially similar to substrate 110 of FIG. 1A, and thus, is not described hereinagain. PBG structure 114 of FIG. 1B is similar to PBG structure 112 of FIG. 1A, however, PBG structure 114 includes a second honeycomb-like structure over the first honeycomb-like structure of PBG structure 112 of FIG. 1A. The second honeycomb-like structure is offset from the first honeycomb-like structure. In one embodiment, the second honeycomb-like structure is offset from the first honeycomb-like structure by approximately one-third of a diameter of a cylinder.

FIG. 1C is a perspective view of one embodiment of a 3D photonic bandgap device in an intermediate stage of fabrication. As shown in FIG. 1C, 3D PBG device 104 includes substrate 110 and PBG structure 116. Substrate 110 of FIG. 1C is substantially similar to substrate 110 of FIG. 1A, and thus, is not described hereinagain. PBG structure 116 of FIG.

1C is similar to PBG structure 114 of FIG. 1B, however, PBG structure 116 includes a third honeycomb-like structure over the second honeycomb-like structure of PBG structure 114 of FIG. 1B. The third honeycomb-like structure is offset from the first honeycomb-like structure. In one embodiment, the third honeycomb-like structure is offset from the first honeycomb-like structure by approximately two-thirds of a diameter of a cylinder.

Figure 1D:
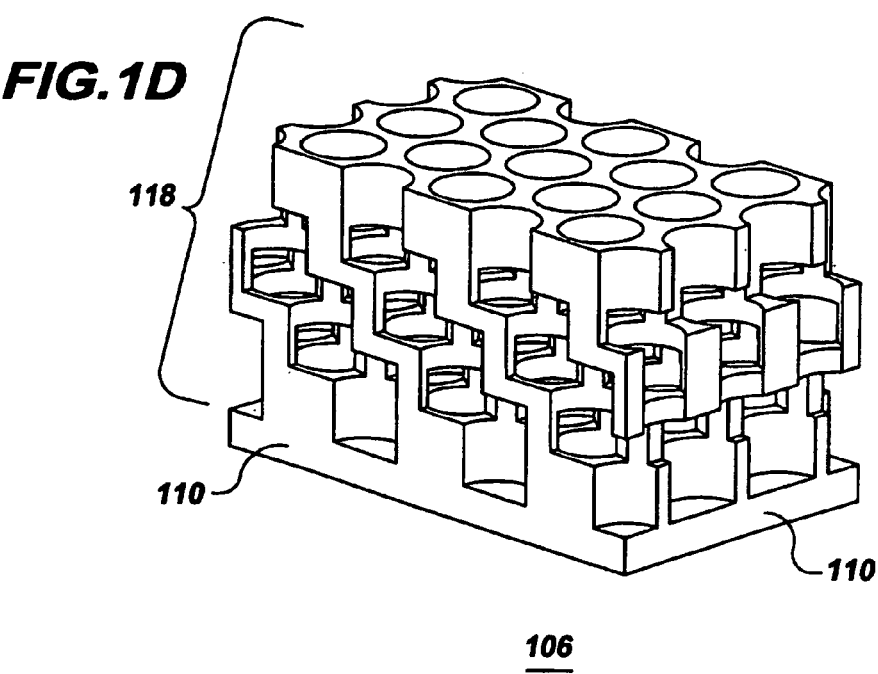
FIG. 1D is a perspective view of one embodiment of a 3D photonic bandgap device.

FIG. 1D is a perspective view of one embodiment of a 3D photonic bandgap device having one period. As shown in FIG. 1D, 3D PBG device 106 includes substrate 110 and PBG structure 118. Substrate 110 of FIG. 1D is substantially similar to substrate 110 of FIG. 1A, and thus, is not described hereinagain. PBG structure 118 of FIG. 1D is similar to PBG structure 116 of FIG. 1C, however, PBG structure 118 includes a fourth honeycomb-like structure over the third honeycomb-like structure of PBG structure 116 of FIG. 1C. The fourth honeycomb-like structure is not offset from the first honeycomb-like structure.

One method of fabricating one embodiment of a 3D photonic bandgap device follows:
 a) providing a substrate comprising a semiconductor layer over an insulator layer;
 b) fabricating a 3D photonic bandgap structure having at least one period over the substrate.

One method of fabricating one embodiment of a 3D photonic bandgap device follows:
 a) providing a substrate comprising a semiconductor layer over an insulator layer;
 b) fabricating a first layer over the substrate, wherein the first layer has periodic regions of high index and low index materials;
 c) fabricating a second layer over the first layer, wherein the second layer has periodic regions of high index and low index materials that are offset from the first layer;
 d) fabricating a third layer over the second layer, wherein the third layer has periodic regions of high index and low index materials that are offset from the first layer and the second layer;
 e) fabricating a fourth layer over the third layer, wherein the third layer has periodic regions of high index and low index materials that are offset from the second layer and the third layer, but not offset from the first layer.

Figure 2A:
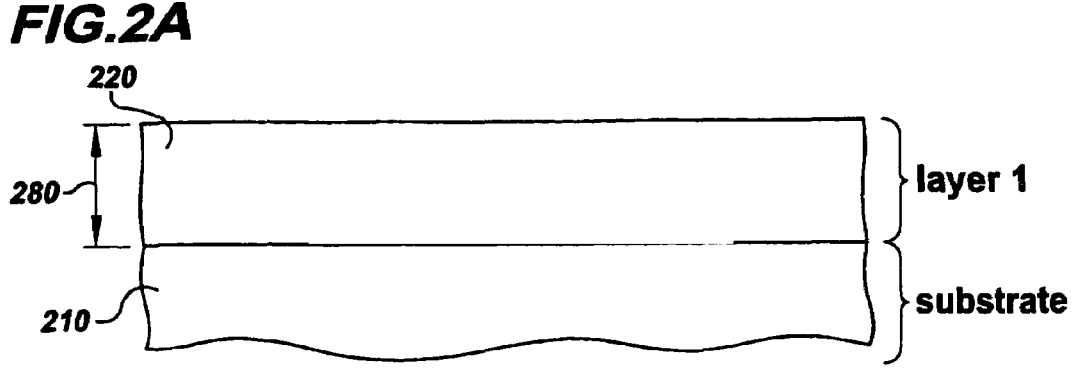
FIG. 2A is a side view of one embodiment of a 3D photonic bandgap device.

FIGS. 2A–2G are side views of one embodiment of a 3D photonic bandgap device in intermediate stages of fabrication. One method of fabricating an embodiment of a 3D PBG device (referred to hereinafter as the "monolithic fabrication method") is described below with regard to FIGS. 2A–2H. In a first event as shown in FIG. 2A, the monolithic fabrication method deposits first layer 220 over substrate 210. First layer 220 has a height 280 and comprises a semiconductor material. In one embodiment, the semiconductor material of first layer 220 comprises silicon. Substrate 210 comprises a semiconductor layer over an insulator layer. In one embodiment, the semiconductor layer of substrate 210 comprises silicon. In one embodiment, the insulator layer of substrate 210 comprises sapphire. In one embodiment, the insulator layer of substrate 210 comprises silicon dioxide.

Figure 2B:
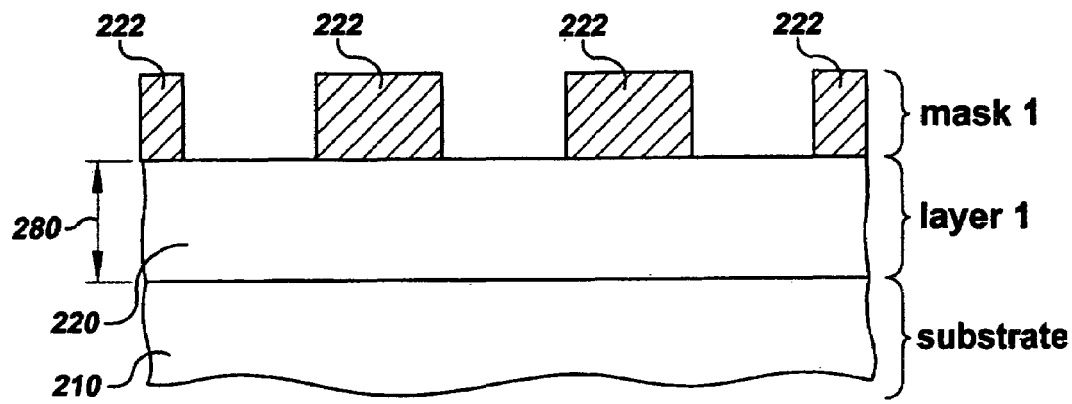
FIG. 2B is a side view of one embodiment of a 3D photonic bandgap device.
Figure 2C:
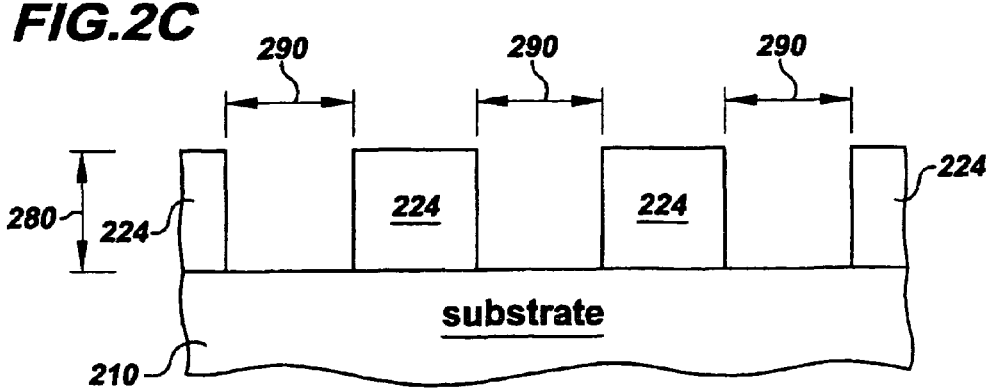
FIG. 2C is a side view of one embodiment of a 3D photonic bandgap device.
Figure 2D:
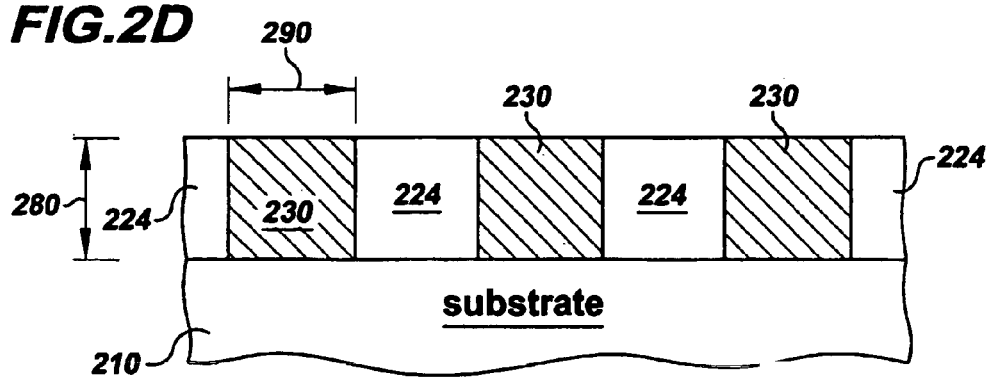
FIG. 2D is a side view of one embodiment of a 3D photonic bandgap device.

In a second event as shown in FIG. 2B, the monolithic fabrication method deposits, patterns and develops photoresist to form first photoresist mask 222 over first layer 220. In a third event as shown in FIG. 2C, the monolithic fabrication method selectively etches first layer 220 to form high index segments 224 having heights 280. High index segments 224 form apertures having diameters 290 and heights 280. In a fourth event as shown in FIG. 2D, the monolithic fabrication method deposits and planerizes a low index material over substrate 210 to form low index segments 230. In one embodiment, low index segments 230 comprise a material selected from the group consisting of silicon dioxide, oxide, polymer and a combination of two or more of the above. FIG. 2D is analogous to FIG. 1A.

Figure 2E:
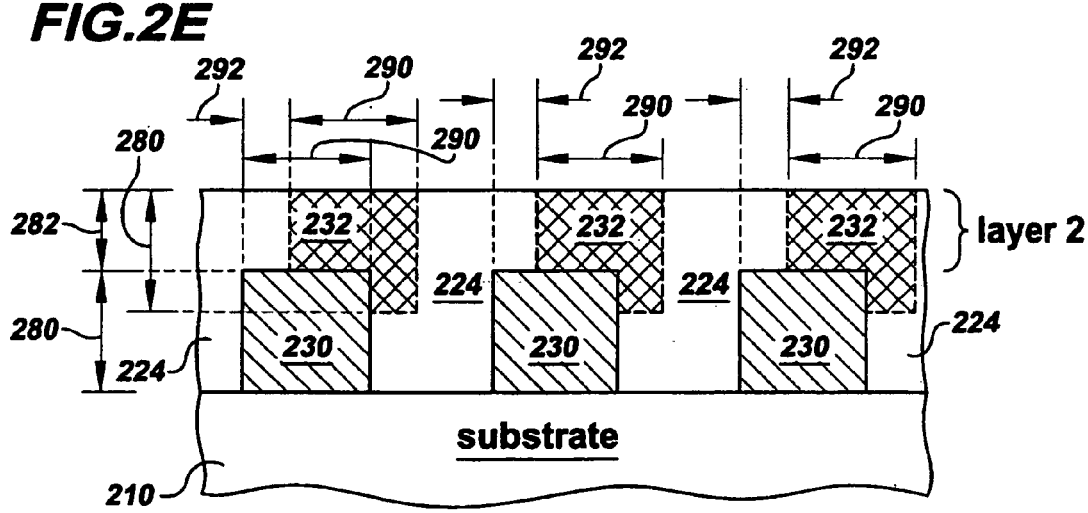
FIG. 2E is a side view of one embodiment of a 3D photonic bandgap device.

In a fifth event, the monolithic fabrication method deposits a second layer over high index segments 224 and low index segments 230. The second layer has a height 282, which is less than height 280. In one embodiment, height 282 is approximately equal to two-thirds of height 280. The second layer comprises semiconductor material such as silicon and germanium. In a sixth event, the monolithic fabrication method deposits, patterns and develops a photoresist over the second layer. In a seventh event as shown in FIG. 2E, the monolithic fabrication method selectively etches the second layer and high index segments 224 to form apertures 232. The semiconductor material of the second layer increments high index segments 224. Apertures 232 have diameters 290. Apertures 232 are offset from low index segments 230 by offset 292. Offset 292 is in at least one direction. In one embodiment, offset 292 is approximately equal to one-third of diameter 290. Apertures 232 are selectively etched into high index segments 224 to a depth approximately equal to height 280.

Figure 2F:
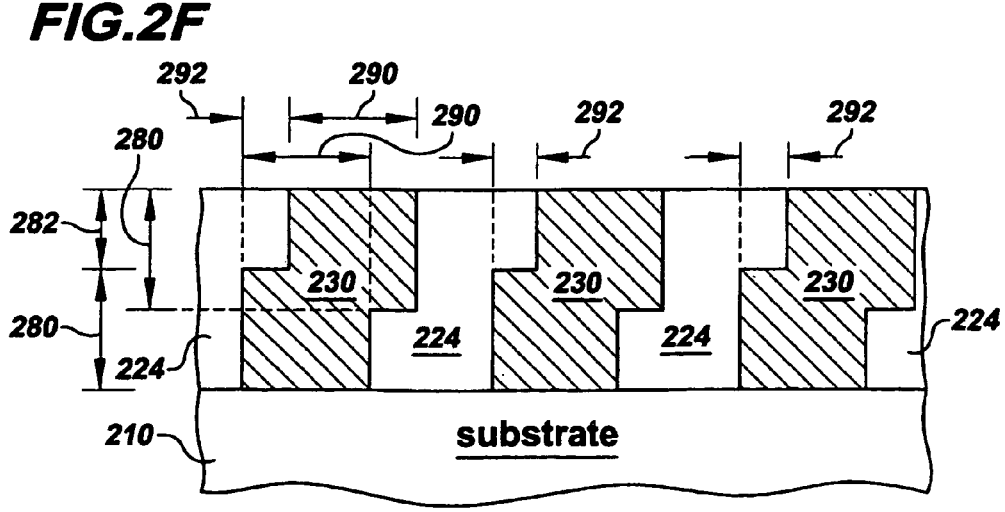
FIG. 2F is a side view of one embodiment of a 3D photonic bandgap device.
Figure 2G:
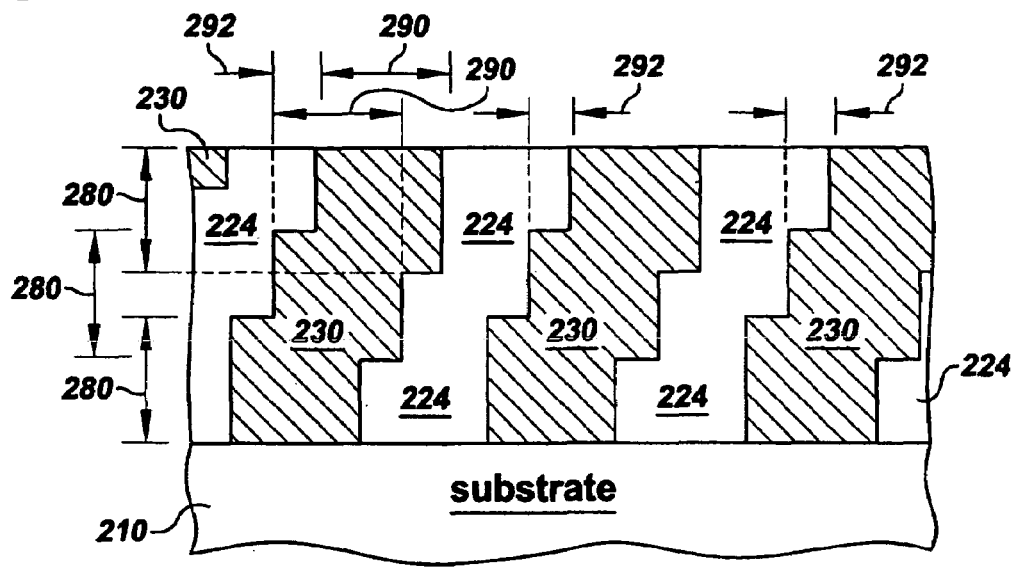
FIG. 2G is a side view of one embodiment of a 3D photonic bandgap device.

In an eighth event as shown in FIG. 2F, the monolithic fabrication method deposits and planerizes a low index material to form low index segments 230. In one embodiment, low index segments 230 comprise a material selected from the group consisting of silicon dioxide, oxide, polymer and a combination of two or more of the above. FIG. 2F is analogous to FIG. 1B. In a ninth event, the monolithic fabrication method repeats the above fifth through eighth events. Specifically, the monolithic fabrication method deposits a third layer over high index segments 224 and low index segments 230. The third layer has a height 282, which is less than height 280. In one embodiment, height 282 is approximately equal to two-thirds of height 280. The third layer comprises semiconductor material such as silicon and germanium. The monolithic fabrication method deposits, patterns and develops a photoresist over the third layer. The monolithic fabrication method selectively etches the third layer and high index segments 224 to form apertures, which have diameters 290 and are offset from the second layer low index segments by offset 292. Offset 292 is in at least one direction. In one embodiment, offset 292 is approximately equal to one-third of diameter 290. Apertures 232 are selectively etched into high index segments 224 to a depth approximately equal to height 280. The monolithic fabrication method deposits and planerizes a low index material to form low index segments 230. In one embodiment, low index segments 230 comprise a material selected from the group consisting of silicon dioxide, oxide, polymer and a combination of two or more of the above. FIG. 2G shows the 3D PBG device after the ninth event. FIG. 2G is analogous to FIG. 1C.

Figure 2H:
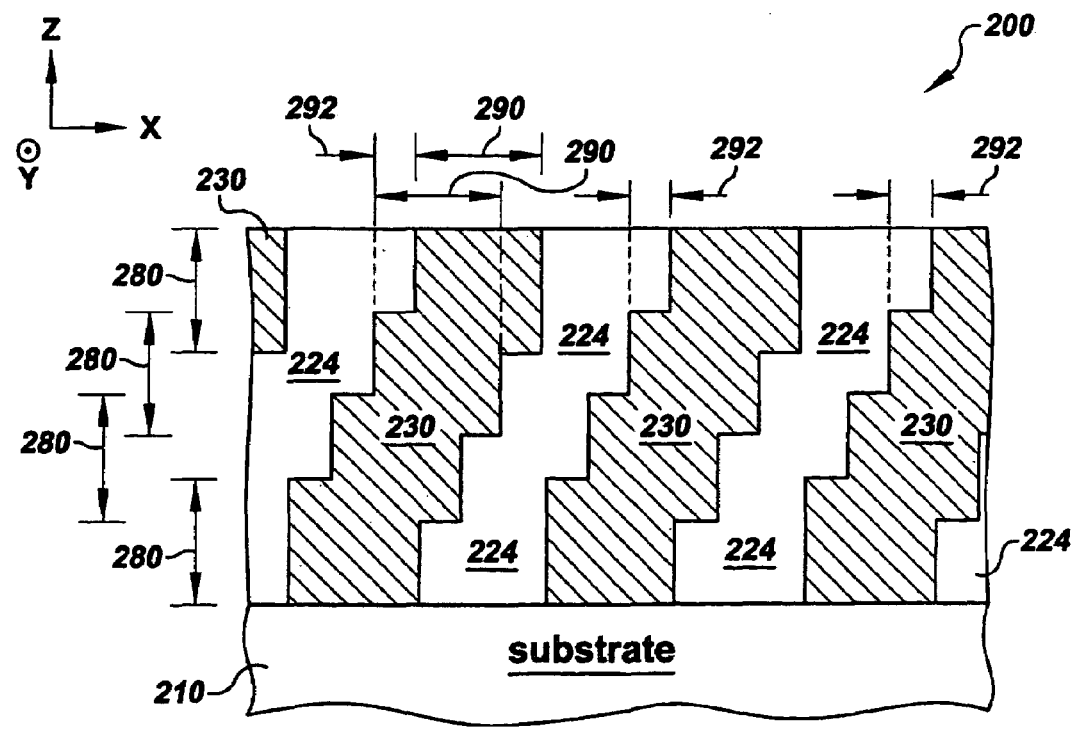
FIG. 2H is a side view of one embodiment of a 3D photonic bandgap device.

In a tenth event, the monolithic fabrication method repeats the above fifth through eighth events. Specifically, the monolithic fabrication method deposits a fourth layer over high index segments 224 and low index segments 230. The fourth layer has a height 282, which is less than height 280. In one embodiment, height 282 is approximately equal to two-thirds of height 280. The fourth layer comprises semiconductor material such as silicon and germanium. The monolithic fabrication method deposits, patterns and develops a photoresist over the fourth layer. The monolithic fabrication method selectively etches the fourth layer and high index segments 224 to form apertures, which have diameters 290 and are offset from the third layer low index segments by offset 292. The apertures are offset from the second layer low index segments by approximately two times offset 292. The apertures are not offset from the first layer low index segments. In one embodiment, offset 292 is approximately equal to one-third of diameter 290. Apertures 232 are selectively etched into high index segments 224 to a depth approximately equal to height 280. The monolithic fabrication method deposits and planerizes a low index material to form low index segments 230. In one embodiment, low index segments 230 comprise a material selected from the group consisting of silicon dioxide, oxide, polymer and a combination of two or more of the above. FIG. 2H shows the 3D PBG device after the tenth event. FIG. 2H is a side view of one embodiment of a 3D photonic bandgap device 200 in SOI having one period. FIG. 2H is analogous to FIG. 1D. In one embodiment, the monolithic fabrication method repeats the above first through tenth events until a desired number of periods is fabricated.

One method of fabricating an embodiment of a 3D PBG device (referred to hereinafter as the "Johnson patent method") is now described. In a first event, the Johnson patent method provides a substrate comprising a semiconductor layer over an insulator layer. In a second event, the Johnson patent method fabricates a 3D photonic bandgap structure having at least one period over the substrate in accordance with the methods described in the above incorporated Johnson patent. Such a 3D photonic bandgap structure is referred to hereinafter as a "rod and hole 3D photonic bandgap structure."

One method of fabricating one embodiment of a 3D photonic bandgap device follows:
 a) providing a substrate comprising a semiconductor layer over an insulator layer;
 b) monolithically fabricating an electronic component including the substrate and a 3D photonic bandgap structure having at least one period over the substrate.

Figure 3:
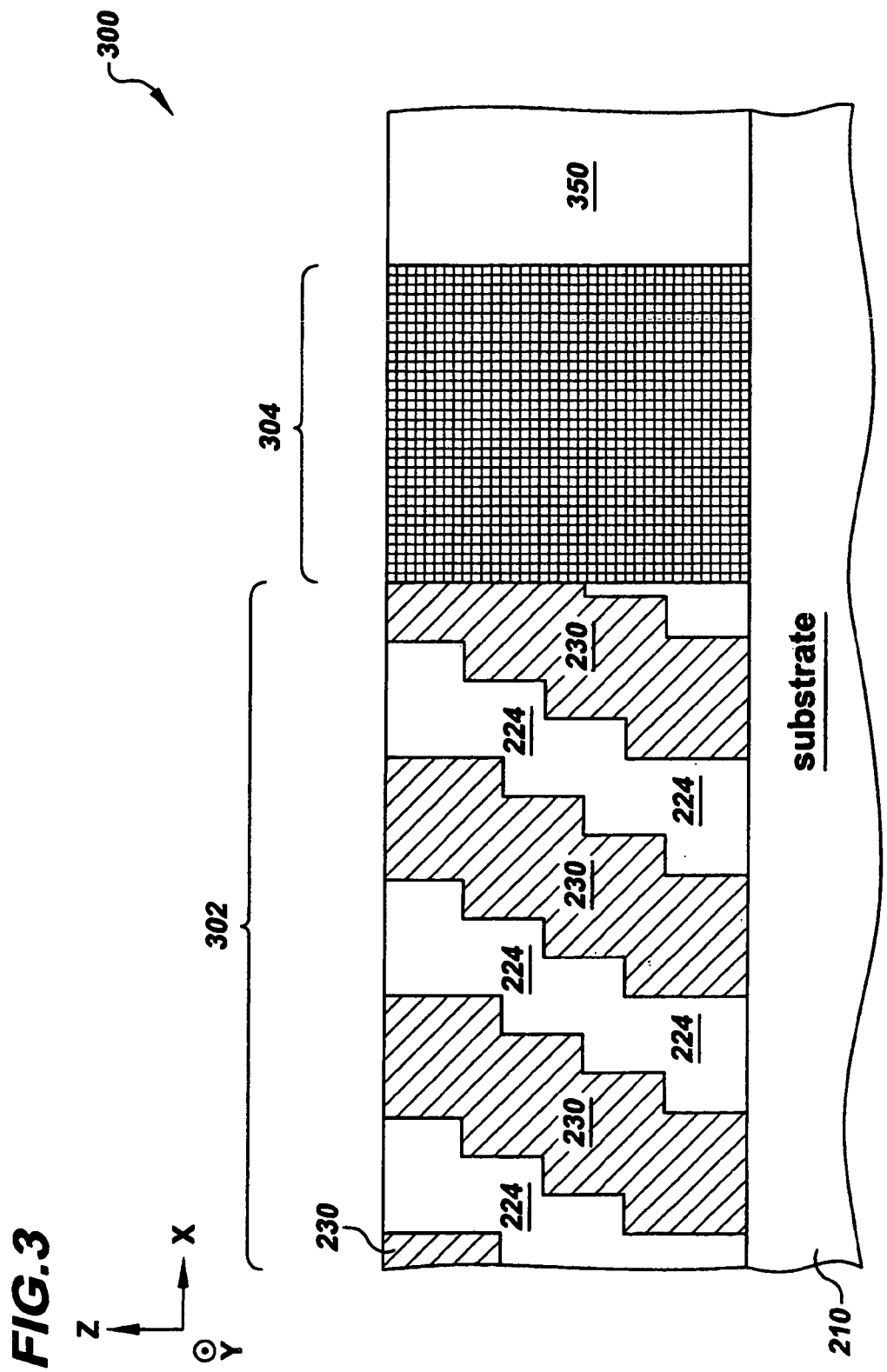
FIG. 3 is a side view of one embodiment of a 3D photonic bandgap device.

FIG. 3 is a side view of one embodiment of a 3D photonic bandgap device having one period. As shown in FIG. 3, 3D PBG device 300 includes 3D PBG structure 302, at least one electronic component 304, substrate 210 and medium 350. 3D PBG structure 302 over substrate 210 is substantially similar to 3D PBG device in SOI 200 of FIG. 2H, and thus, similar components are not described hereinagain. Exemplary electronic components of the at least one electronic component 304 include transistors, photodiodes, photodetectors, phototransistors and metal vias. Substrate 210 is described above with regard to FIG. 2A. Medium 350 may comprise metal, semiconductor or insulator material. In one embodiment, medium 350 comprises semiconductor material. In one embodiment, 3D PBG structure 302 and at least one electronic component 304 are monolithically integrated over substrate 210. In one embodiment, 3D PBG device 300 is monolithically fabricated.

Figure 4A:
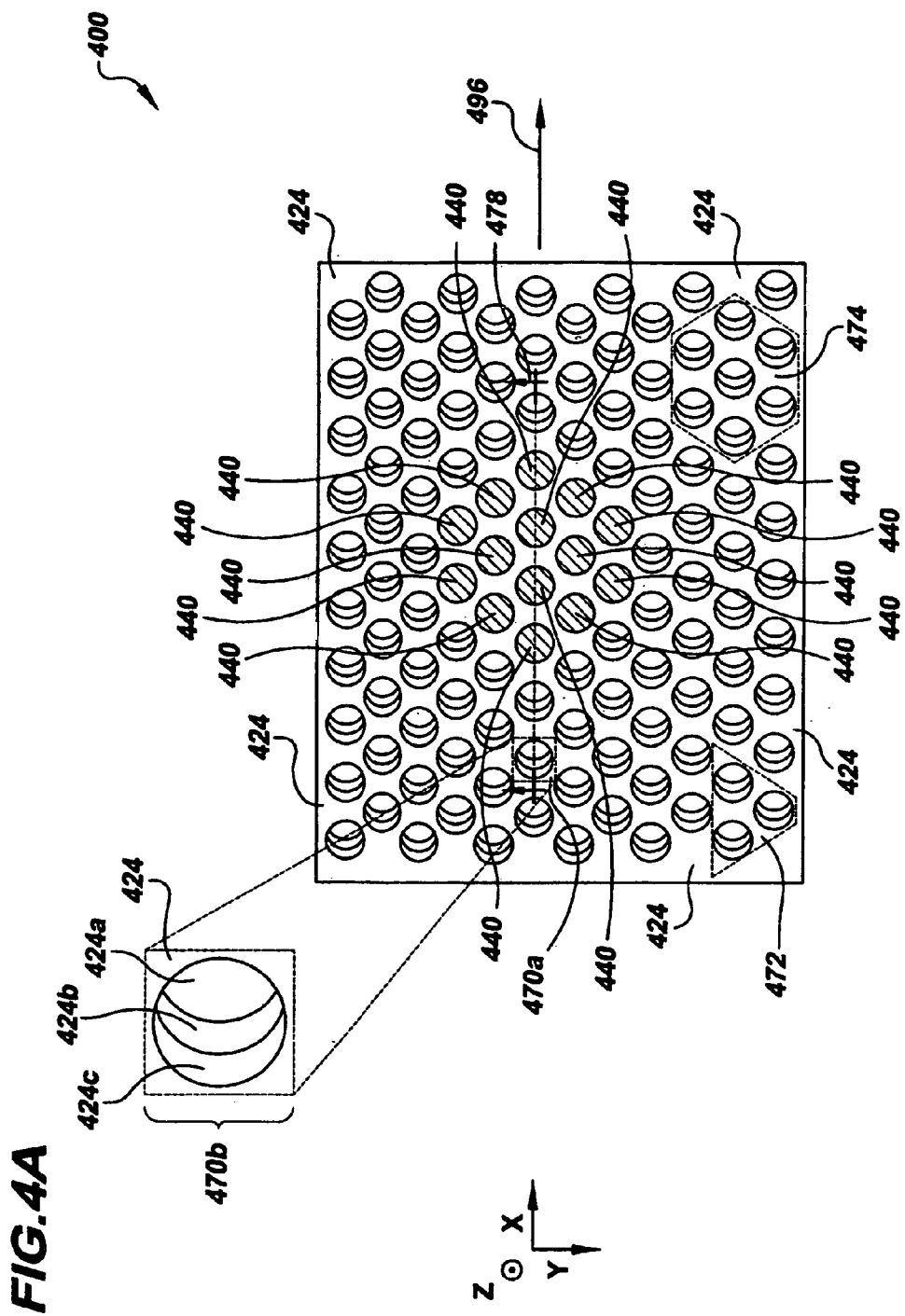
FIG. 4A is a top view of one embodiment of a 3D photonic bandgap device.
Figure 4B:
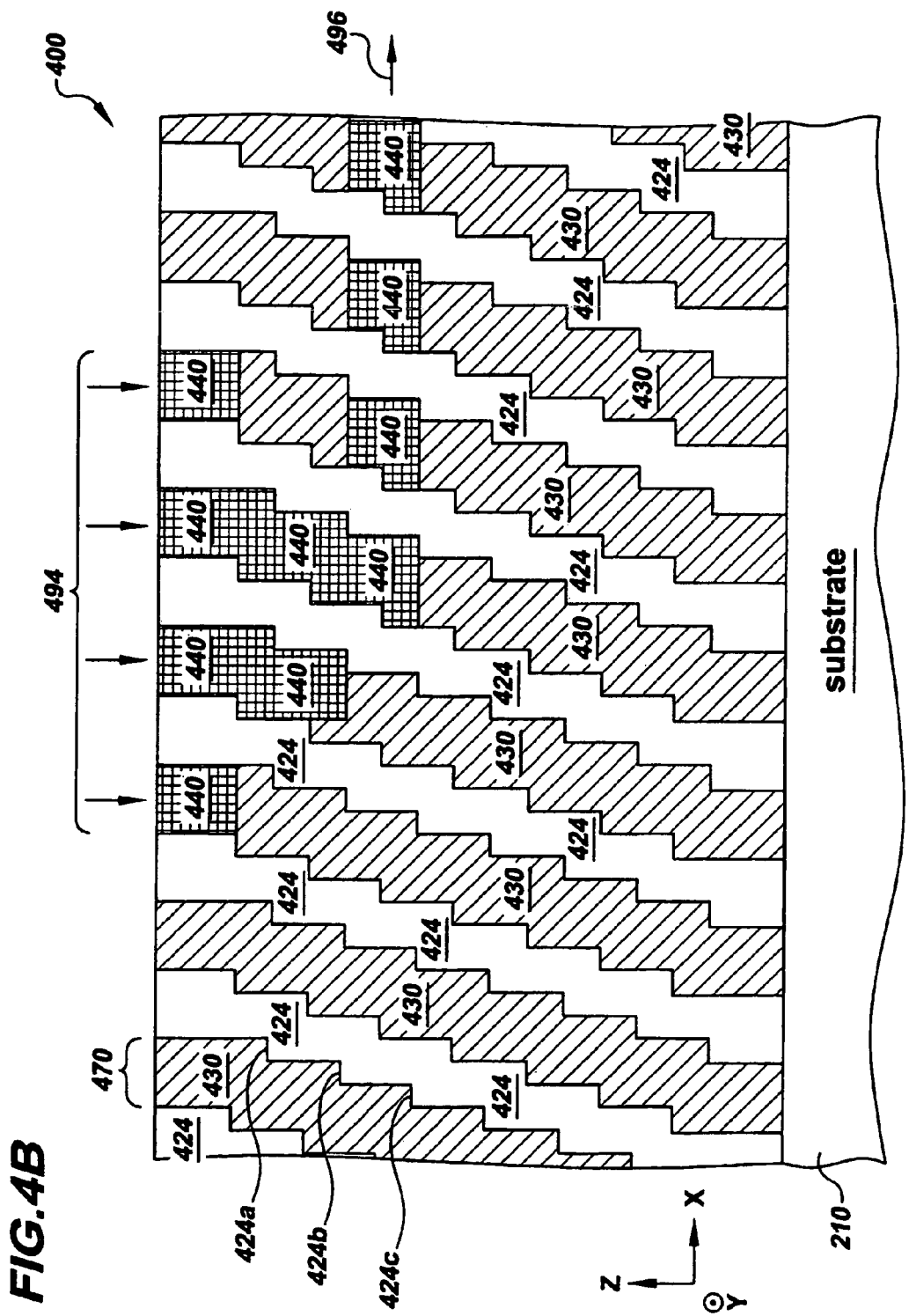
FIG. 4B is a side view of one embodiment of a 3D photonic bandgap device.

FIGS. 4A and 4B are views of an embodiment of a 3D photonic bandgap device in a funnel waveguide configuration. FIG. 4A is a top view of one embodiment of a 3D photonic bandgap device. FIG. 4B is a side view of one embodiment of a 3D photonic bandgap device as viewed across cross-section line 478 of FIG. 4A. As shown in FIGS. 4A and 4B, 3D PBG device 400 includes high index regions 424, low index regions 430 (not labeled in FIG. 4A), crystal defect regions 440 and substrate 210 (not shown in FIG. 4A). In the 3D photonic bandgap device embodiment of FIGS. 4A and 4B, low index regions 430 comprise air. Thus, as shown in FIG. 4A with reference to expanded view area 470b, high index regions 424a, 424b and 424c are visible despite having different depths relative to a top surface of 3D PBG 400. Expanded view area 470b is an expanded view of area 470a. As shown in FIG. 4B, high index region 424a has a depth less than high index region 424b, which has a depth less than high index region 424c. High index regions 424 and low index regions 430 are analogous to high index segments 224 and low index segments 230, respectively, which are described above with reference to FIGS. 2D–2H, and thus, are not described hereinagain.

Crystal defect regions 440 are regions that only allow specific frequencies of light to propagate. Crystal defect regions 440 can be fabricated by intentionally introducing defects along a photonic crystal. As shown in FIG. 4B, crystal defect regions 440 taper to form a funnel waveguide configuration coupled to a horizontal waveguide. Specifically, crystal defect regions 440 taper from a large surface area of crystal defect regions 440 to a small surface area of crystal defect regions 440 with respect to an X-Y plane moving along the negative Z axis until coupling with a horizontal waveguide formed from crystal defect regions 440. As shown in FIG. 4B, light rays 494 strike 3D PBG device 400 incident to a top surface of 3D PBG device 400. Light rays 494 propagate through crystal defect regions 440 because light rays 494 have the specific frequencies that are allowed to propagate through crystal defect regions 440. Crystal regions 440 funnel light rays 494. Light rays 494 exit 3D PBG device 400 as represented by light ray 496.

In one embodiment, 3D PGB device 400 comprises a plurality of triangular patterns of apertures. An exemplary triangular pattern 472 is shown on FIG. 4A. In one embodiment, 3D PGB device 400 comprises a plurality of center-faced hexagonal patterns of apertures. An exemplary center-faced hexagonal pattern 474 is shown on FIG. 4A.

We claim:
1. An apparatus, comprising:
 a) a substrate having a semiconductor layer over an insulator layer;
 b) a 3D photonic bandgap structure having at least one period operatively coupled to said substrate and comprising a plurality of honeycomb-like structures having a plurality of high index regions and a plurality of low index regions, wherein said plurality of honeycomb-like structures comprises at least four honeycomb-like structures layered over each other, wherein a second honeycomb-like structure is offset from a first honeycomb-like structure, wherein a third honeycomb-like structure is offset from a second honeycomb-like structure, and wherein a fourth honeycomb-like structure is not offset from said first honeycomb-like structure.

2. The apparatus of claim 1, wherein said semiconductor layer comprises silicon.

3. The apparatus of claim 1, wherein said semiconductor layer comprises germanium.

4. The apparatus of claim 1, wherein said insulator layer comprises silicon dioxide.

5. The apparatus of claim 1, wherein said insulator layer comprises sapphire.

6. The apparatus of claim 1, wherein said 3D photonic bandgap structure comprises a rod and hole 3D photonic bandgap structure.

7. The apparatus of claim 1, wherein said plurality of high index regions comprises semiconductor material.

8. The apparatus of claim 1, wherein said plurality of low index regions comprises air.

9. The apparatus of claim 1, wherein said plurality of low index regions comprises silicon dioxide.

10. The apparatus claim 1, wherein said second honeycomb-like structure is offset from said first honeycomb-like structure by approximately one-third of a diameter of an aperture of said first honeycomb-like structure, wherein said third honeycomb-like structure is offset from said second honeycomb-like structure by approximately one-third of said diameter of said aperture, and wherein a fourth honeycomb-like structure is not offset from said first honeycomb-like structure.

11. The apparatus of claim 1, wherein said apparatus further comprises at least one electronic component operatively coupled to said substrate.

12. The apparatus of claim 11, wherein said at least one electronic component and said 3D photonic bandgap structure are monolithically integrated over said substrate.

13. The apparatus of claim 11, wherein said at least one electronic component comprises electronic components selected from the group consisting of transistors, photodiodes, photodetectors, phototransistors and a combination of two or more of the above electronic components.

14. The apparatus of claim 1, wherein said apparatus has a funnel waveguide configuration.

15. The apparatus of claim 14, wherein said apparatus further comprises at least one electronic component operatively coupled to said substrate.

16. An apparatus, comprising:
   a) a substrate having a semiconductor layer over an insulator layer;
   b) a 3D photonic bandgap structure having at least one period operatively coupled to said substrate and comprising a plurality of honeycomb-like structures having a plurality of high index regions and a plurality of low index regions, wherein said plurality of honeycomb-like structures comprises at least four honeycomb-like structures layered over each other, wherein a second honeycomb-like structure is offset from a first honeycomb-like structure, wherein a third honeycomb-like structure is offset from a second honeycomb-like structure, and wherein a fourth honeycomb-like structure is not offset from said first honeycomb-like structure;
   c) at least one electronic component operatively coupled to said substrate.

17. An apparatus, comprising:
   a) a substrate having a semiconductor layer over an insulator layer;
   b) a 3D photonic bandgap structure having at least one period operatively coupled to said substrate and comprising a plurality of honeycomb-like structures having a plurality of high index regions and a plurality of low index regions, wherein said plurality of honeycomb-like structures comprises at least four honeycomb-like structures layered over each other, wherein a second honeycomb-like structure is offset from a first honeycomb-like structure, wherein a third honeycomb-like structure is offset from a second honeycomb-like structure, and wherein a fourth honeycomb-like structure is not offset from said first honeycomb-like structure, wherein said 3D photonic bandgap structure has a plurality of crystal defect regions that only allow specific frequencies of light to propagate;
   c) at least one electronic component operatively coupled to said substrate.

18. The apparatus of claim 17, wherein said plurality of crystal defect regions have a funnel waveguide configuration.

\* \* \* \* \*